UNITED STATES PATENT OFFICE.

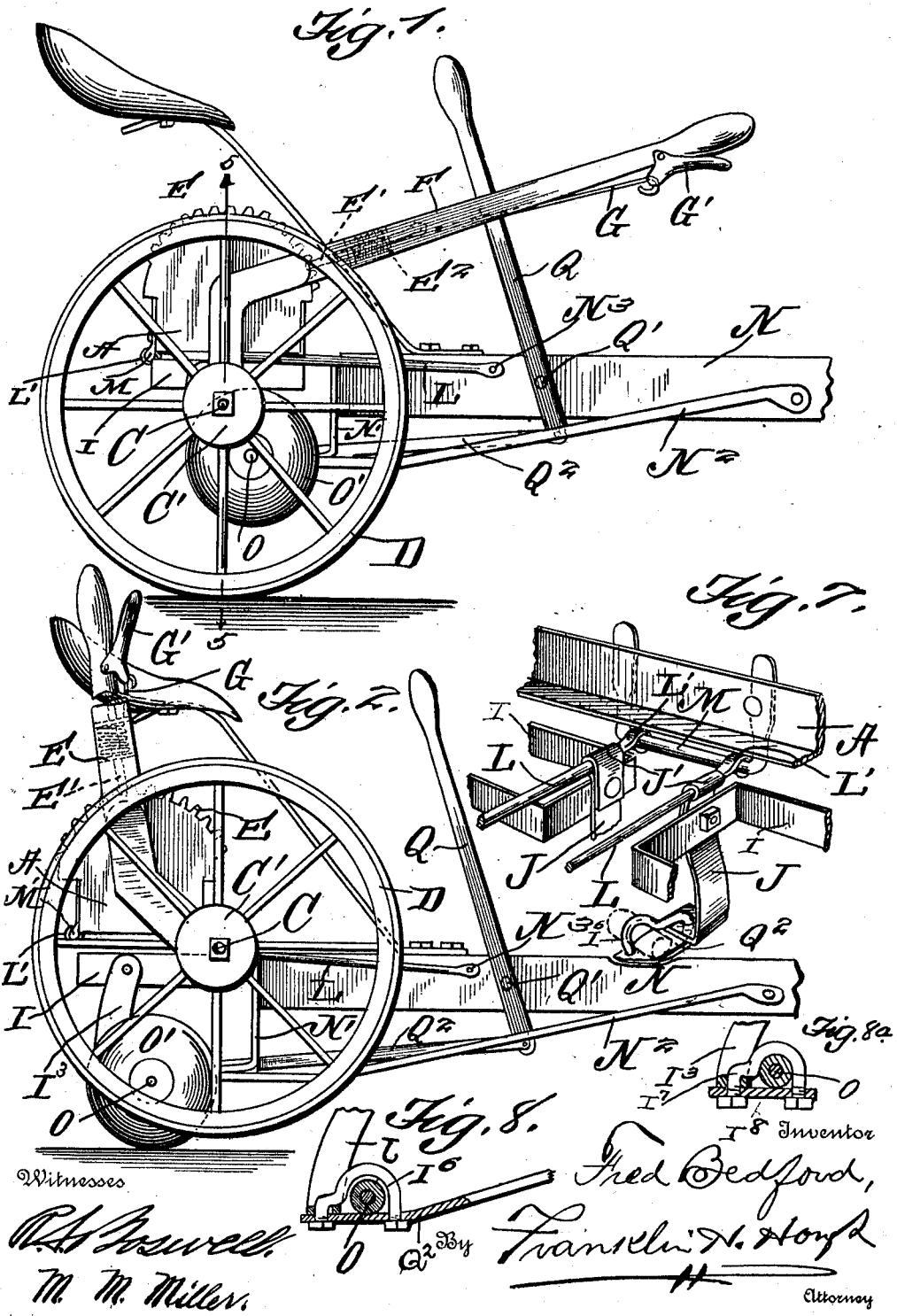

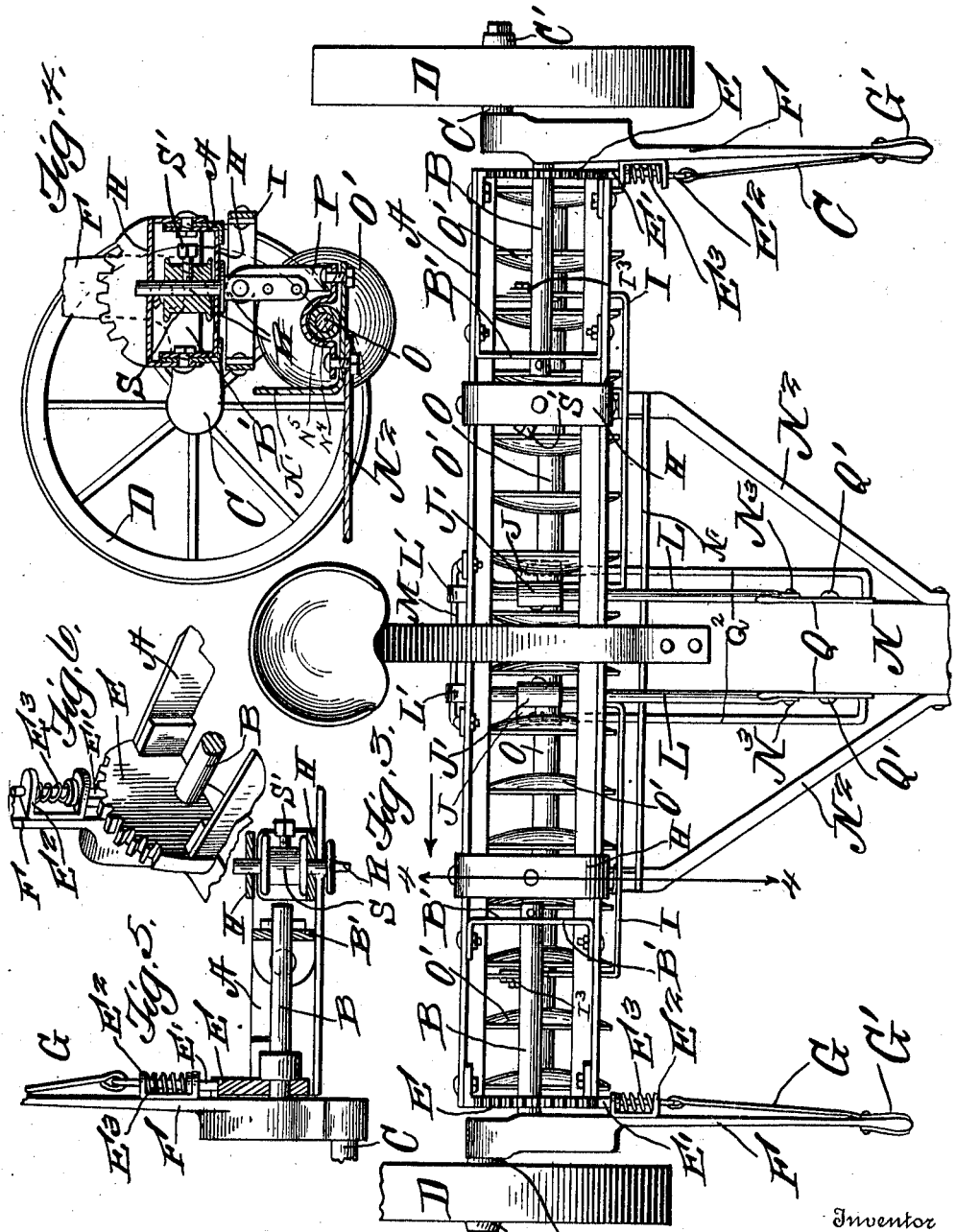

FRED BEDFORD, OF STRATTON, NEBRASKA.

ATTACHMENT FOR DISK HARROWS.

990,216.  Specification of Letters Patent. Patented Apr. 25, 1911.

Application filed July 31, 1909. Serial No. 510,511.

*To all whom it may concern:*

Be it known that I, FRED BEDFORD, a citizen of the United States, residing at Stratton, in the county of Hitchcock and State of Nebraska, have invented certain new and useful Improvements in Attachments for Disk Harrows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachments for disk harrows, forming means whereby the harrow when not in use may be raised from the ground and the apparatus transported from place to place.

The invention consists further in connection with a harrow disk of a frame to which the harrow is attached and having inclined wheels, the frame being adapted to be raised and lowered to cause harrows to cut at different depths in the ground.

The invention comprises various other details of construction, combinations and arrangements of parts which will be hereinafter fully described and then specifically defined in the appended claims.

I illustrate my invention in the accompanying drawings, in which:—

Figure 1 is an end elevation showing the disks at their highest limit. Fig. 2 is a similar view showing the disks lowered. Fig. 3 is a top plan view. Fig. 4 is a sectional view on line 4—4 of Fig. 3. Fig. 5 is a detail sectional view on line 5—5 of Fig. 1. Fig. 6 is a detail perspective view showing the pawl and segment means for holding the harrow frame in adjusted positions. Fig. 7 is a detail perspective view showing the manner of connecting the harrow frame to the wheel carrying frame. Fig. 8 is a detail sectional view showing the bearing for a disk gang and supporting means for the bearing. Fig. 8$^a$ is a detail view showing the manner of supporting the outer end of a harrow shaft.

Reference now being had to the details of the drawings by letter, A designates a rectangular outlined frame, preferably of metal, and having stub shafts B journaled in suitable bearings in the ends of the frame and in cross-pieces B', as shown clearly in Figs. 3 and 5 of the drawings, and fixed to said stub shafts are the stub axles C upon which the wheels D are journaled, said wheels being held in place by means of the nuts C'. Fixed to the ends of said frame are the segment plates E, and E' designates a pawl mounted in the bracket member E$^2$ on the lever F and adapted to be held in engagement with the teeth of the segment by means of springs E$^3$.

Projecting from each stub axle C is a lever F, and G designates a rod pivotally connecting the hand lever G' upon the levers F to the pawl E'. It will be noted that each end of the frame is equipped with similar lever mechanism whereby, as the levers are thrown in one direction or the other, one or both ends of the frame may be raised or lowered.

Upon reference to the drawings, it will be noted that I have shown two rectangular outlined frames, each designated by letter I, and to the inner end of each frame, as shown in Fig. 7 of the drawings, is fastened a bar J, the upper end of each of said bars being bent to form a roll J' through which the rods L pass, thus forming a loose bearing for said bars J. The rear end of each of the rods L is turned to form a sleeve L' through which the rod M passes, which latter is fixed to one end of the rectangular outlined frame A. The forward ends of the rods L are fastened to the opposite sides of the tongue N, as shown clearly in Fig. 3 of the drawings. Vertically disposed bars P having their lower ends angled are fastened to the lower angled ends of a bar N', one end of the latter being shown in Fig. 4 of the drawings. A bearing plate N$^4$ is also fastened to the angled end of the bar N' by means of bolts and also to the angled end of the bar P and coöperates with the horizontally disposed portion of the bar N' which is fastened to the rear end of said tongue N, to hold the hollow shaft N$^5$, in which the shaft O is positioned, in place. There is a slight play intermediate the said hollow shaft N$^5$ and the plate N$^4$ to allow the former to have a slight oscillating movement as the harrow shaft is tilted. Said harrow shaft is tilted by means of the lever Q which is pivotally connected at Q' to the tongue and has its lower end connected by means of the rod Q$^2$ with the bar J, as shown clearly in Fig. 8 of the drawings. It will be noted in Fig. 8 that a staple I⁶ has its ends passing through apertures in the rod Q² and clamps the bearing and the inner end of the harrow shaft. The outer end of each rectangular frame I has a bar I³ pivoted thereto and its lower end has fastened thereto a strap I⁷, as shown in Fig. 8ª of the drawings, and which strap engages the bearing and the plate I⁸ upon which said hollow shaft rests.

Adjustably and loosely fastened to each upright bar P is a bar R, the upper portion of which is cylindrical and passes through registering apertures in cross bars H upon the frame A. S designates a collar apertured to receive the cylindrical portion of the bar R, and S′ designates a set screw passing through an aperture in the collar and adapted to engage the bar R to hold said collar in an adjusted position. It will be understood that the pivotal connection between the harrow frame and the bar P is loose so as to allow the harrow frame to have a slight tilting movement as one or the other of the levers connected to the frame is operated.

Suitable braces N² are fastened at their forward ends to the tongue upon opposite sides thereof, and their rear ends are fastened to the ends of the plate N′, one of which connections being shown clearly in Fig. 4 of the drawings.

The operation of my invention is as follows:—When it is desired to hold the harrow disks in the position shown in Fig. 1 of the drawings so that the apparatus may be conveyed from one place to another without the harrows coming in contact with the ground, the levers are swung forward to assume the position shown in said figure. In the event of it being desired to lower the harrows, the levers F may be manipulated, one or both, to lower one end or the other of the apparatus so that the disks will cut into the ground the desired depth. By the manipulation of the levers Q, the harrow frames may be slightly oscillated upon the pivotal bars R, the pivotal connection of bar I³ with frame I permitting the outer ends of the disk shafts to swing.

What I claim to be new is:—

1. In combination with a harrow, a rectangular outlined frame, stub shafts journaled in the ends thereof, each stub shaft having a drop axle, wheels journaled upon said axle, segment plates upon the frame, a lever fastened to each drop portion of the axle, a pawl carried by the lever and adapted to engage the segment member, a tongue, rods fastened to the opposite sides of said tongue and projecting rearward of the same and connected to said rectangular outlined frame, oscillating harrow frames supported by said frame, bars fastened to each oscillating frame and harrow shafts supported by said bars, the bars at the inner end of each frame being turned into sleeves, which are movable upon said rods, levers pivoted to the tongue and connected each to an inner end of a harrow shaft.

2. In combination with a harrow, a rectangular outlined frame, stub shafts journaled in the ends thereof, each stub shaft having a drop axle, wheels journaled upon said axle, segment plates upon the frame, a lever fastened to each drop portion of the axle, a pawl carried by the lever and adapted to engage the segment member, a tongue, rods fastened to the opposite sides of said tongue and projecting rearward of the same and connected to said rectangular outlined frame, a swiveled bar mounted in apertures in cross pieces upon said frame, a bar fastened to the tongue and its ends fastened loosely to each of said swiveled bars, braces fastened to the forward ends of the tongue and their rear ends secured to said bar which is secured to said tongue, levers pivoted upon the tongue, bars having sleeves at their upper ends engaging the rods which project rearward from the tongue and movable thereon, rods connecting said levers with the lower ends of said sleeved bars, and bearing members upon the bar fastened to the tongue and upon each of said rods which are connected to said levers and carry a disk carrying shaft.

In testimony whereof I hereunto affix my signature in the presence of two witnesses.

FRED BEDFORD.

Witnesses:
F. M. PFRIMMER,
J. S. FITZGERALD.

---

Copies of this patent may be obtained for five cents each, by addressing the "Commissioner of Patents, Washington, D. C."